(12) United States Patent
Reddy et al.

(10) Patent No.: US 12,086,676 B1
(45) Date of Patent: Sep. 10, 2024

(54) UNIVERSAL TRACKING TAG MESSAGE ROUTER

(71) Applicant: Ferret Systems Inc., La Jolla, CA (US)

(72) Inventors: Joseph Reddy, San Diego, CA (US); Venu Gutlapalli, San Diego, CA (US); Gary Leung, San Jose, CA (US)

(73) Assignee: Ferret Systems Inc., La Jolla, CA (US)

( * ) Notice: Subject to any disclaimer, the term of this patent is extended or adjusted under 35 U.S.C. 154(b) by 0 days.

(21) Appl. No.: 18/448,880

(22) Filed: Aug. 11, 2023

(51) Int. Cl.
*G06K 7/10* (2006.01)
*G06Q 10/0833* (2023.01)
*H04L 9/40* (2022.01)

(52) U.S. Cl.
CPC ..... *G06K 7/10366* (2013.01); *G06Q 10/0833* (2013.01); *H04L 63/0428* (2013.01)

(58) Field of Classification Search
CPC .................................................. G06K 7/10366
USPC ....................................................... 235/451
See application file for complete search history.

(56) References Cited

U.S. PATENT DOCUMENTS

2011/0248852 A1\* 10/2011 Falk ..................... H04L 63/0428
340/572.1

\* cited by examiner

*Primary Examiner* — Rafferty D Kelly
(74) *Attorney, Agent, or Firm* — ARC IP Law, PC; Joseph J. Mayo (57) ABSTRACT

A routing system that can receive, decode, and route messages from electronic tracking tags made by different manufacturers and issued by different tag issuers. Tracking tags may be placed on items that are shipped or stored, and wireless messages from the tags may be used to track the items and their status. The system enables a site to use a single gateway that obtain messages from heterogeneous tracking tags; the gateway forwards messages to the routing system for processing. The system may access a tag manufacturers database that contains a descriptor of the messages from each manufacturer's tags, and a tag registrations database that lists tags associated with each tag issuer. The system supports tag messages with encrypted contents and with tag identifiers that are rotated to prevent malicious tracking, and it may check message integrity to detect modification of the message after it is sent from the tag.

9 Claims, 10 Drawing Sheets

UNIVERSAL TRACKING TAG MESSAGE ROUTER

BACKGROUND OF THE INVENTION

Field of the Invention

One or more embodiments of the invention are related to the fields of electronic tracking devices and information systems. More particularly, but not by way of limitation, one or more embodiments of the invention enable a universal tracking tag message router.

Description of the Related Art

Electronic tags for identifying and tracking items are widely used for supply chain management. Examples include RFID tags, and Bluetooth-enabled tags. Tags are made by many different manufacturers who supply these tags to a large number of tag issuers (such as shipping companies). Tags from different manufacturers and issuers are generally incompatible since they transmit different types of data in different formats. As a result, sites that manage items tagged by different tag issuers currently need to install different gateways to read and process data from each issuer's tag. This proliferation of gateways is expensive and complex. There are no known solutions that enable sites to read tag data with a single gateway that accommodates different types of tags.

For at least the limitations described above there is a need for a universal tracking tag message router.

BRIEF SUMMARY OF THE INVENTION

One or more embodiments described in the specification are related to a universal tracking tag message router. The message router may support a variety of tag message formats from different tag manufacturers, allowing users for example to use a single gateway to receive tag messages from various types of tags.

One or more embodiments of the invention may include a processor coupled by communications links to multiple tag issuers, multiple tag message gateways, a tag manufacturer database, and a tag registration database. Each tag issuer may issue one or more of multiple tracking tags that are coupled to items to be tracked. Each tracking tag may be associated with a tag manufacturer of multiple tag manufacturers. Each tracking tag may have a tag identifier that uniquely identifies the tag. Each tag message gateway may be configured to receive tag messages from one or more of the tracking tags over a wireless communications link when they are within range of the gateway, and to forward the tag messages to the processor. Each of these one or more tags may be associated with any of the tag issuers and with any of the tag manufacturers. Each tag message may include a manufacturer identifier that identifies the tag manufacturer of the tracking tag that sends the tag message, a sender identifier based on the tag identifier of the tracking tag, and tag message contents.

The tag manufacturer database may have a tag message descriptor associated with each tag manufacturer that includes the manufacturer's identifier, and a message descriptor that describes contents of tag messages from tags manufactured by that tag manufacturer. The tag registration database may have the tag identifier associated with each tracking tag, and a tag issuer associated with each tracking tag.

The processor may be configured to receive updates to the tag registration database from each tag issuer, and to receive tag messages from each tag message gateway. The processor may process each tag message to obtain the manufacturer identifier from the tag message, retrieve the tag message descriptor associated with the manufacturer identifier from the tag manufacturer database, calculate the tag identifier from the sender identifier, retrieve the tag issuer associated with the tag identifier from the tag registration database, and provide the tag identifier and the tag message contents to the tag issuer.

In one or more embodiments, the tag message descriptor may also include an encrypted flag that indicates whether all or a portion of the tag message contents is encrypted. The tag registration database may also include decryption information associated with each tracking tag that has encrypted message contents. When the encrypted flag of a tag message descriptor is true, the processor may also be configured to retrieve the decryption information associated with the tag identifier from the tag registration database, and to decrypt the tag message contents using the decryption information.

In one or more embodiments the decryption information may include an issuer key associated with each tag issuer that issues tracking tags with encrypted message contents. Decrypting the tag message may include retrieving the issuer key associated with the tag identifier from the tag registration database, calculating a tag key based on the issuer key and on the tag identifier, and decrypting the tag message using the tag key.

In one or more embodiments, each tag message may also have a tag message integrity check field, and the processor may be configured to calculate an expected integrity check field from the tag message contents and from the tag key, compare the expected integrity check field to the tag message integrity check field, and transmit an alert to the tag issuer associated with the tag identifier when the expected integrity check field does not match the tag message integrity check field.

In one or more embodiments, the tag message descriptor may also include a sender identifier rotation flag that indicates whether the sender identifier changes over time to prevent unauthorized tracking, and calculation of the tag identifier from the sender identifier may include transforming the sender identifier of each tag message into the tag identifier based on the sender identifier rotation flag of the tag message descriptor.

In one or more embodiments, the tag issuer associated with one or more tracking tags may change over time.

In one or more embodiments, the tag message contents may include measurement of one or more sensor values from one or more sensors of the tracking tag, and the processor may transform the tag message contents using the tag message descriptor to one or more key-value pairs containing these one or more sensor values.

In one or more embodiments, each tag message gateway may be configured to transmit gateway information to the processor with the tag messages, and the processor may be configured to calculate a location of a tracking tag associated with each tag message from one or both of the tag message contents and the gateway information, and to provide the location of the tracking tag to the tag issuer.

In one or more embodiments the wireless communications link between one or more tags and the tag message gateway may include one or more of Bluetooth, Bluetooth Low Energy, RFID, NFC, and Wi-Fi.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A universal tracking tag message router will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
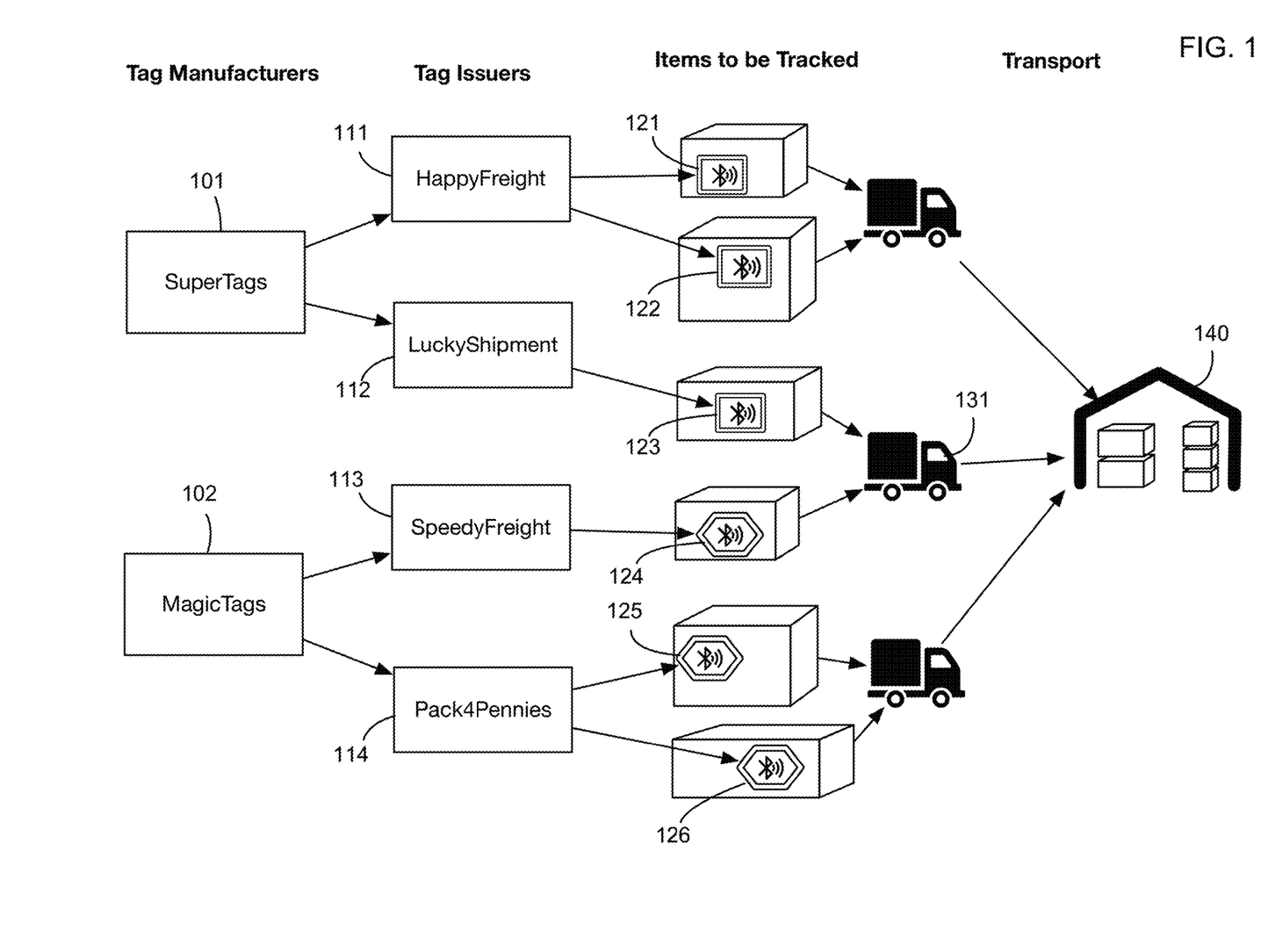
FIG. 1 shows an illustrative problem addressed by one or more embodiments of the invention: tracking tags attached to packages are made by multiple manufacturers and are issued by multiple tag issuers, and packages with heterogeneous tags may need to be tracked in the same environments.

Electronic tracking tags are increasingly used to track items, packages, and containers as they move through a supply chain. These tags transmit messages over wireless channels that identify the items and that may provide additional information such as sensor readings from sensors embedded in the tags. Tags are made by many different manufacturers who supply these tags to a large number of tag issuers (such as shipping companies). Tags from different manufacturers and issuers are generally incompatible since they transmit different types of data in different formats. This tag heterogeneity creates a potential problem as illustrated in FIG. 1. In this example, two different tag manufacturers 101 and 102 supply tags to four different tag issuers 111, 112, 113, and 114. Each issuer may issue multiple tags that are each attached to an item to be tracked, such as a shipping box or container. Each tag issuer generally comprises a computer configured to communicate with one or more embodiments of the system. The example of Figure 1 shows tags 121 and 122 issued by issuer 111, tag 123 issued by issuer 112, tag 124 issued by issuer 113, and tags 125 and 126 issued by issuer 114; each of these tags is placed onto (or into) a corresponding box or other item. The challenge with these heterogeneous tags from different manufacturers and issuers is that different types of tags may need to be tracked in a common environment. For example, box with tag 123 may be placed on the same truck 131 as box with tag 124; if the truck contains electronics to receive information from the tags, it must be able to handle these two different types of tags that are from different manufacturers and different issuers. Boxes with all of the different tags 121 through 126 may arrive in a common warehouse 140, where receiving messages from these heterogeneous tags poses an even greater challenge.

Figure 2:
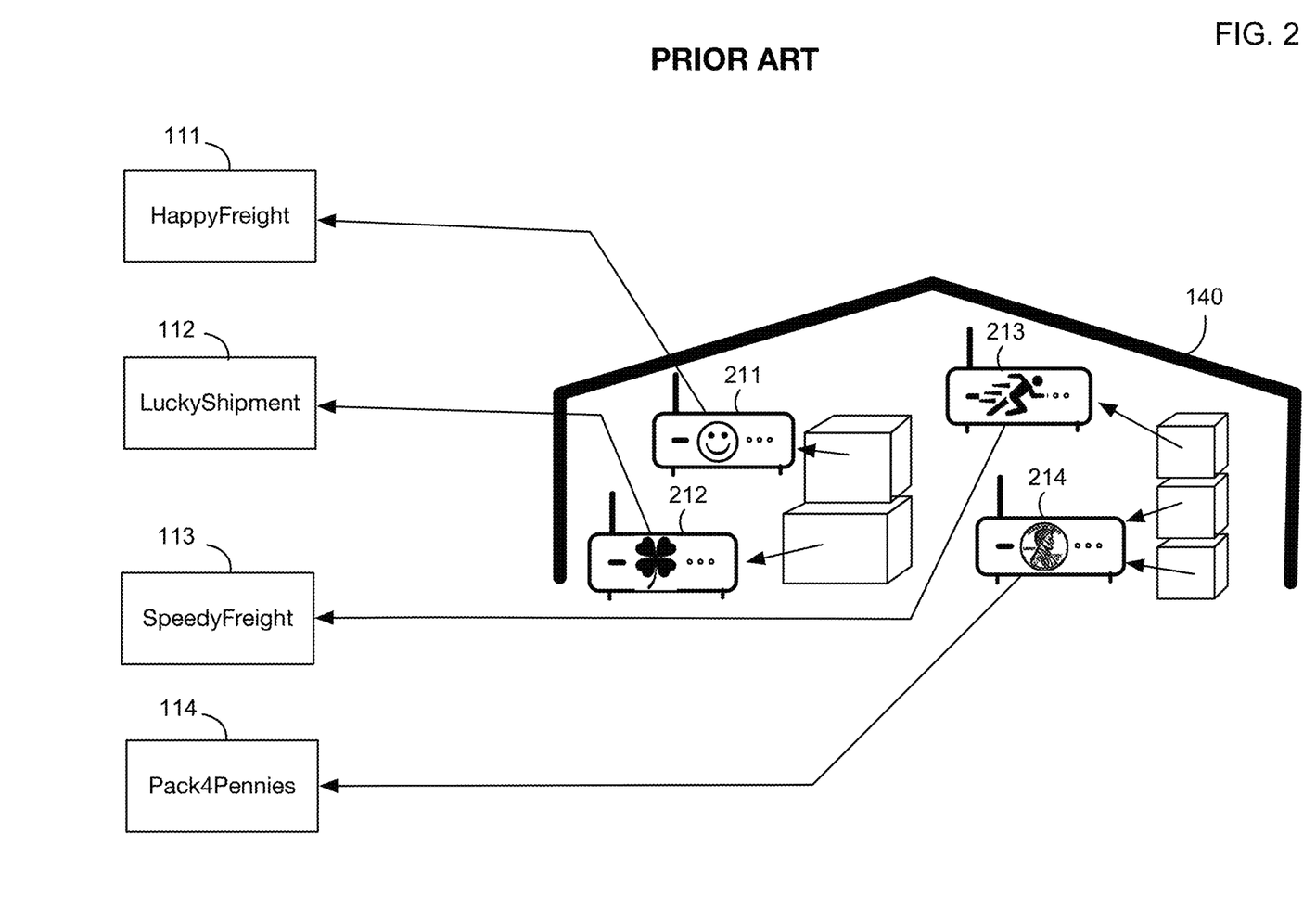
FIG. 2 shows a solution to the problem of FIG. 1 that is typically used in the prior art: a separate gateway associated with each tag issuer is installed in any environment that may receive packages tagged with tags from that issuer.

FIG. 2 shows a typical solution in the prior art to the problem illustrated in FIG. 1. The solution is illustrated for a typical warehouse 140 that receives items with tags from multiple manufacturers and issuers. The solution includes installing a separate gateway for each type of tag, which reads tag messages from the associated tags and forwards data to the associated tag issuer. In warehouse 140, gateway 211 reads messages from tags issued by tag issuer 111, gateway 212 reads messages from tags issued by tag issuer 112, gateway 213 reads messages from tags issued by tag issuer 113, and gateway 214 reads messages from tags issued by tag issuer 114. Messages may be interpreted and displayed locally by each gateway (or by attached processors with software adapted to the individual issuer's tags), or they may be forwarded to the associated tag issuer. While this solution can work, it leads to a proliferation of hardware and software at each site that needs to deal with heterogeneous tags. There may also be technical problems with wireless communication when multiple gateways are sharing the same channels, so this type of solution may not scale well beyond a small number of different gateways or a relatively small number of tags.

Figure 3:
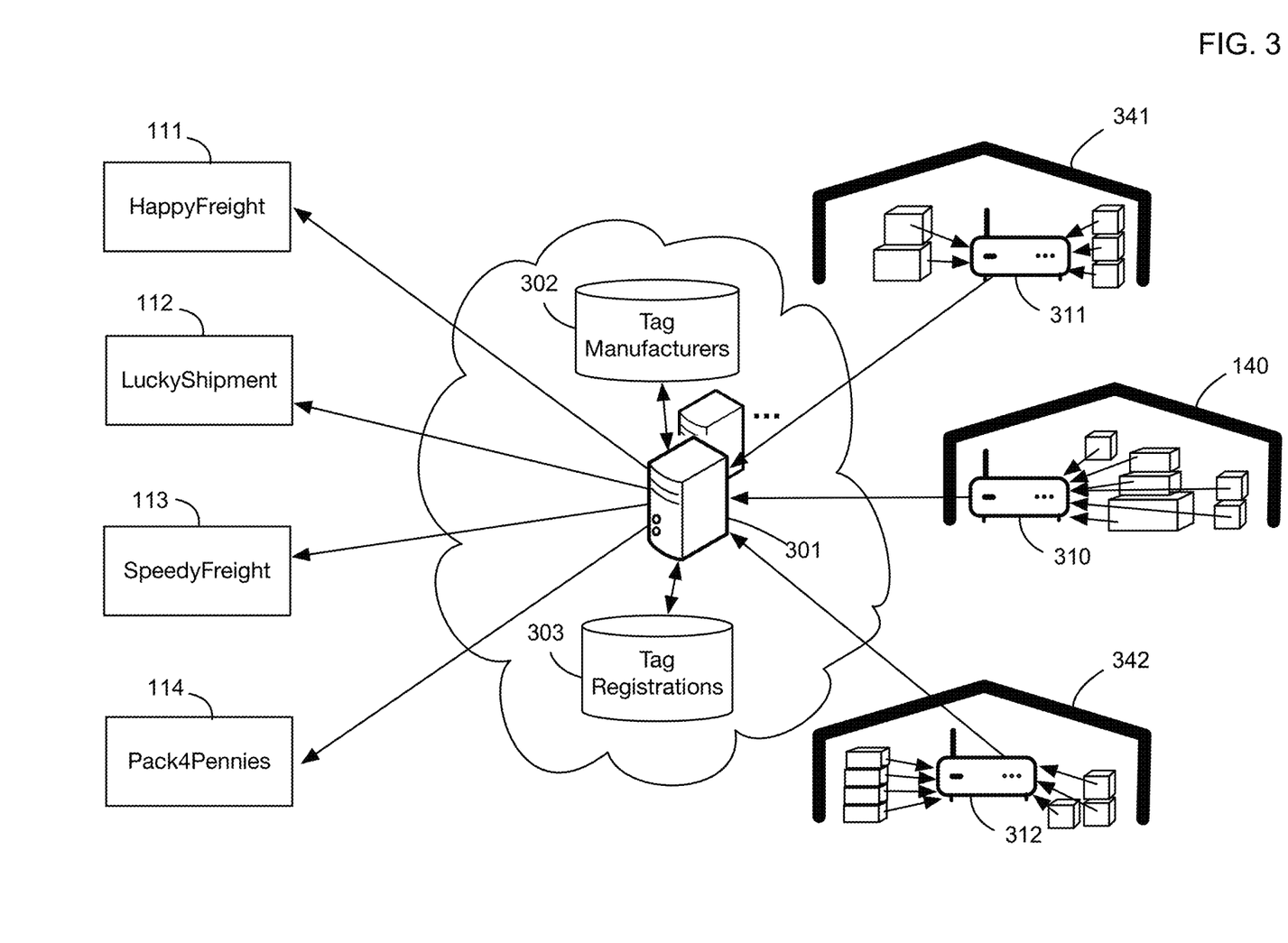
FIG. 3 shows a solution to the problem of FIG. 1 provided by one or more embodiments of the invention: a single gateway in each location reads messages from each type of tag and forwards these messages to a central server for decoding and routing to the tag issuer.

One or more embodiments of the invention address the problems and limitations of the solution of FIG. 2 by using a single universal tag message router that intermediates between different types of tags and their tag issuers. This solution is illustrated in FIG. 3 with a central processor or processors 301 providing the universal tag message router functionality. Each site or environment that may receive tag messages may forward these messages to the processor 301. Each site may need only a single gateway (or a single gateway per zone if it is a large site) that receives and forwards all tag messages form the site, regardless of the tag manufacturer or tag issuer of the tag. For example, in FIG. 3, warehouse 140 has a single gateway 310 that forwards all tag messages to processor 301. Similarly warehouse 341 has a single gateway 311, and warehouse 342 has a single gateway 312, each of which forward all tag messages to processor 301. Processor 301 may receive and interpret these tag messages from all gateways and may determine which tag issuer should receive each tag message. Processor 301 is connected to each of the tag issuers 111, 112, 113, and 114, and it forwards messages from each gateway 310, 311, and 312 to the appropriate tag issuer. The gateways 310, 311, 312 can be generic, and they do not need to be customized to individual manufacturers' tag message formats. When new tag manufacturers or tag issuers are added, existing gateways can be used and the central processor 301 will manage the new tag message formats.

To process received tag messages from the gateways, the processor 301 may access database 302 of tag manufacturers and database 303 of tag registrations. The tag manufacturers database 302 may for example describe the tag message format associated with each tag manufacturer. The tag registrations database 303 may contain information about the tags issued by each tag issuer. Processor 301 may use these databases to interpret tag messages and to determine which tag issuer to route messages to. The databases 302 and 303 may be of any data format or formats, including for example, without limitation, files, records, relational or non-relational databases, or in-memory data structures. In one or more embodiments the databases 302 and 303 may be combined into a single database that includes both tag manufacturer and tag registration information. Data may be stored, organized, and accessed in any desired manner. In one or more embodiments any or all of the processor(s) 301 and database(s) 302 and 303 may be cloud-based resources; they may use dedicated hardware, or they may be virtual resources on shared hardware.

Processor C01 may contain any type of processor or processors, including for example, without limitation, any type or types of server, desktop computer, laptop, notebook, cloud-based processor(s) or virtual processor(s), CPU, GPU, microprocessor, microcontroller, computing circuit, ASIC, or any network of any number of these devices. It may be coupled to memory and to any other peripherals, and it may have communications interfaces to communicate over wired or wireless networks with the gateways, the databases, and the tag issuers.

Gateways such as 310, 311, and 312 may use any type or types of wireless networks to receive messages from tags, including for example, without limitation, Bluetooth, Bluetooth Low Energy, RFID, Wi-Fi, NFC, or Cellular networks. Gateways may be local to a site (such as a Bluetooth gateway) or remote from the site (such as a cellular receiver). Gateways may be coupled to processor 301 via any types of wired or wireless networks. Different gateways may use different types of networks to communicate with tags or with the processor.

Figure 4:
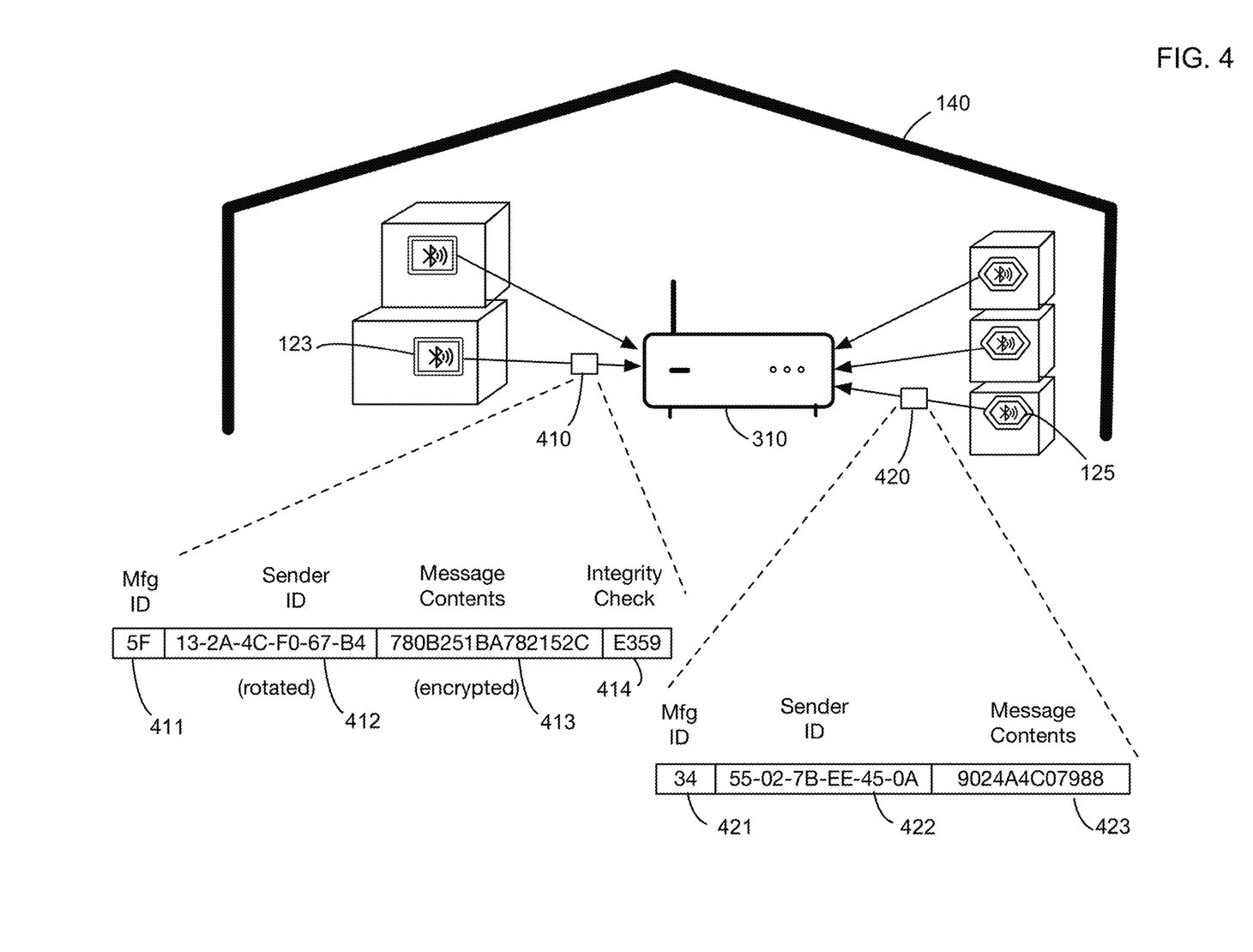
FIG. 4 shows illustrative tag messages that may be forwarded to the server by the gateway.

In one or more embodiments, tag messages from different types of tags may have certain common features to facilitate processing of these messages by the processor 301. FIG. D shows two illustrative tag messages: message 410 is sent from tag 123 to gateway 310 (which then forwards the message to the processor), and message 420 is sent from tag 125 to gateway 310 (which then forwards the message to the processor). Tags 123 and 125 are made by different tag manufacturers, and they have different tag message formats. However, each message has a field that identifies the tag manufacturer: field D11 in message 410 contains a tag manufacturer identifier for the manufacturer of tag 123, and field 421 in message 420 contains a tag manufacturer identifier for the manufacturer of tag 125. Tag manufacturer identifiers may be of any length and format. Tag messages from different manufacturers may place tag manufacturer identifiers in different portions of a tag message and may represent these identifiers in different ways. Each tag message also has a field that identifier the sender of the message (the tag): field 412 in message D10 contains a sender identifier for tag 123, and field 422 in message 420 contains a sender identifier for tag 125. The sender identifier may be for example a MAC address in one or more embodiments; however, sender identifiers may be of any length and any format. Different tags may have different types of sender identifiers. For some types of tags, the sender identifier may correspond to a fixed tag identifier that is assigned to the tag and that never changes (such as a MAC address that is programmed into the tag at manufacturing time). For example, in message 420 the sender identifier 422 is the (fixed) tag identifier. In some types of tags, however, the sender identifier may change over time to prevent malicious tracking of the tag. For these tags the sender identifier may be derived from the tag identifier (using a pseudo-random sequence, for example), but a malicious actor snooping tag messages may not be able to easily recover the fixed tag identifier from the rotating sender identifier. In message 410 the sender identifier 412 is a rotated value that changes over time and may be derived from the tag identifier of tag A23.

Tag message may have message contents that contain any type of information, such as values from tag sensors or tag status data. Message contents fields of tag messages may have any lengths and formats, and these may differ among tags. A single tag may also send different types of message contents at different times. In some tags the message contents may be encrypted; for example, in message 410 the message contents field 413 is encrypted, but in message 420 the message contents field 423 is not encrypted.

Some tags may add an integrity check field to their tag messages so that the receiver of the message can verify that the tag message was not altered after it was sent from the tag. A message integrity check field 414 is included in tag message D10, but no such field is included in message 420.

Figure 5:
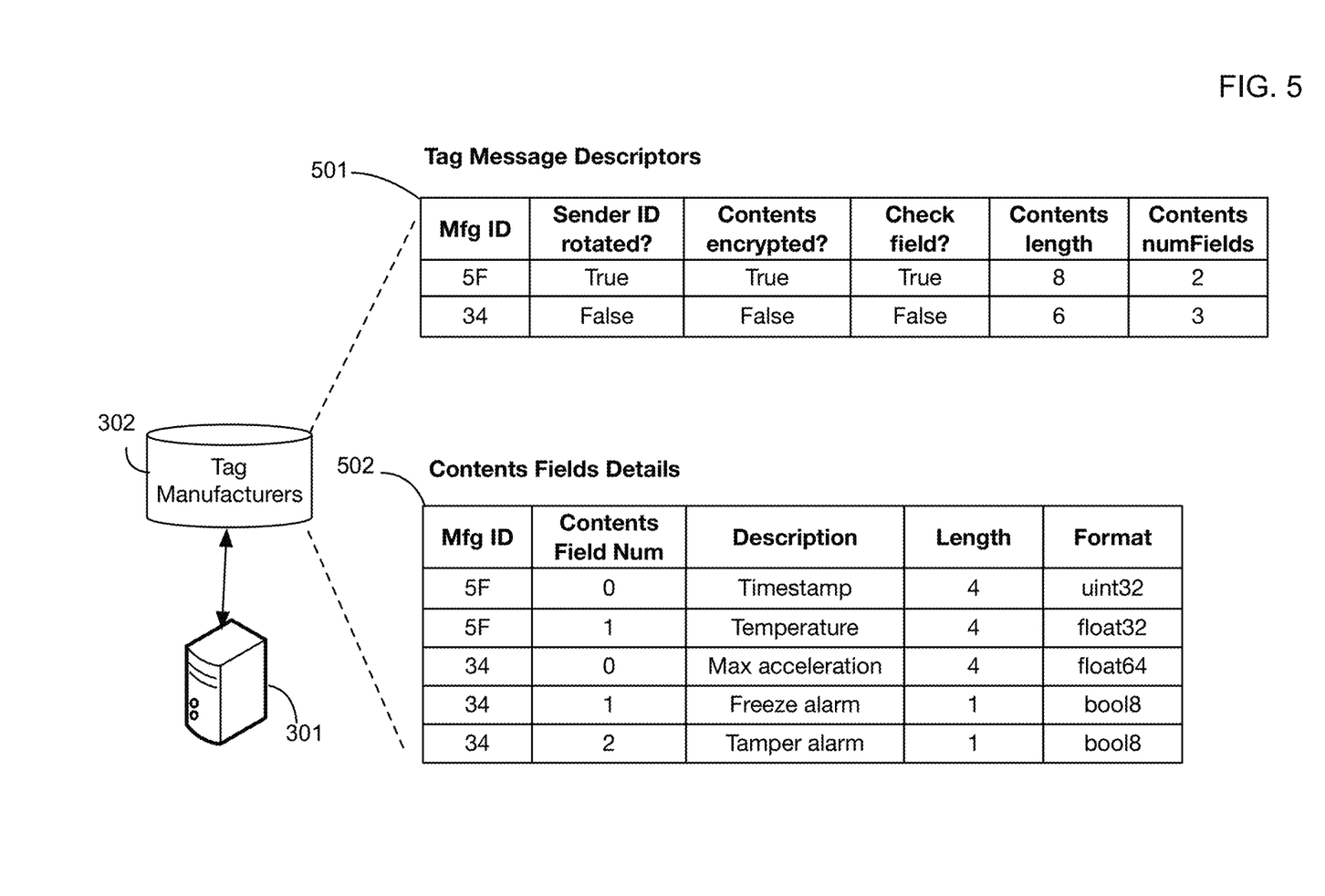
FIG. 5 shows an illustrative database of tag message descriptors associated with tag manufacturers that may be used in one or more embodiments of the invention.

FIG. 5 shows illustrative data in a tag manufacturers database 302. This database may for example describe the tag message formats and message options for messages from tags made by each manufacturer. This data may be organized in any desired manner. In the example shown in FIG. 5, database 302 contains a tag message descriptors table 501, which has information describing tag messages from each manufacturer. A message descriptor may have any type of information that describes message format and contents. Illustrative table 501 is indexed by a manufacturer identifier field, which identifies the manufacturer. In one or more embodiments a single manufacturer may supply different models or types of tags, and different descriptors may be associated with each model or type. A model or type may be identified for example by a different field, or by the message length; for example, a single tag manufacturer may be associated with different entries in table 501, each corresponding to a different message length. As illustrated in FIG. 4, some manufacturers may transmit a sender identifier that is rotated (changed over time) to prevent malicious tracking; the message descriptor table 501 may have one or more fields that indicate whether sender identifiers are rotated (and potentially what algorithm is used for rotation). Some manufacturers may encrypt the message contents, and one or more fields in table E01 may indicate whether message contents are encrypted (and potentially how they are encrypted). Some manufacturers may include a message integrity check field in the message, and one or more fields in table 501 may indicate whether there is a check field (and potentially how it is calculated).

Additional fields in a message descriptor may describe the message contents of tag messages from the manufacturer. In illustrative database 302, this data appears in table 501 and in a contents fields details table 502. Table 501 contains the length of the message contents portion of the tag message, and the number of fields it contains. The details table 502 lists each separate field in the message contents, along with its description, length, and format. This data is illustrative;

one or more embodiments may describe tag messages and their contents field in any desired manner using any type or types of tables, fields, or other data structures.

Figure 6A:
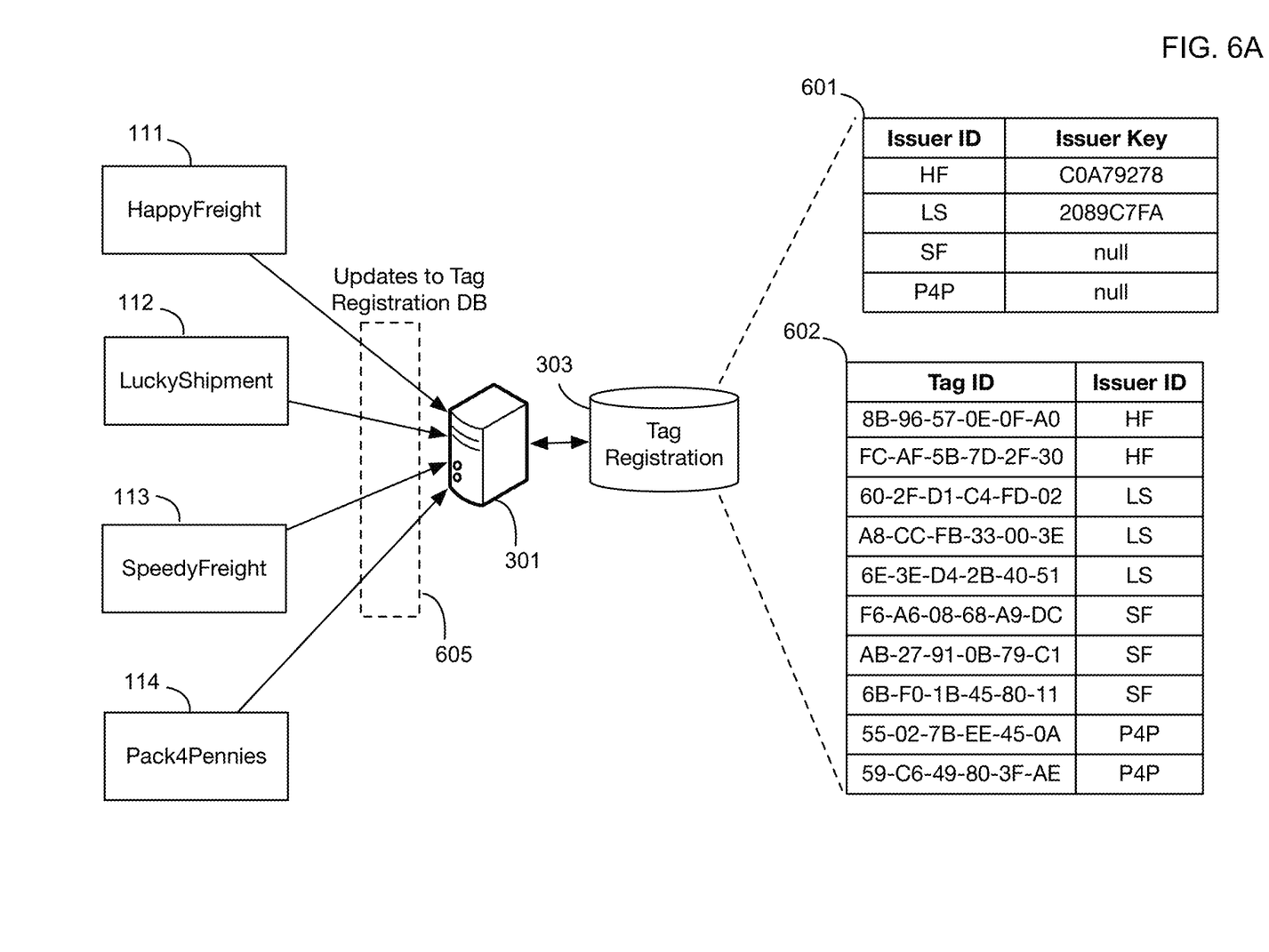
FIG. 6A shows an illustrative database of tag registration information that may be used in one or more embodiments of the invention.

FIG. 6A shows an illustrative tag registration database 303. One potential purpose of this database is to indicate which tags are associated with which tag issuers. Tag issuers such as 111, 112, 113, and 114 may transmit database updates 605 to processor 301 (or directly to database C03) to register specific tags or groups of tags and associate these tags with their issuers. Illustrative table 602 identifies each registered tag with its tag identifier, for example, and associates the tag with an identifier of the tag issuer. One or more embodiments may store any additional information associated with tags or tag issuers in the tag registration database 303. For example, table 601 associates an issuer key with those tag issuers who use encrypted tag messages (tag issuers without encrypted tag messages may have a null in the issuer key field for example). This issuer key may be used to encrypt and decrypt tag message contents, as described below. In one or more embodiments, encryption keys may be associated with any or all of the tag, the tag issuer, and the tag manufacturer.

Figure 6B:
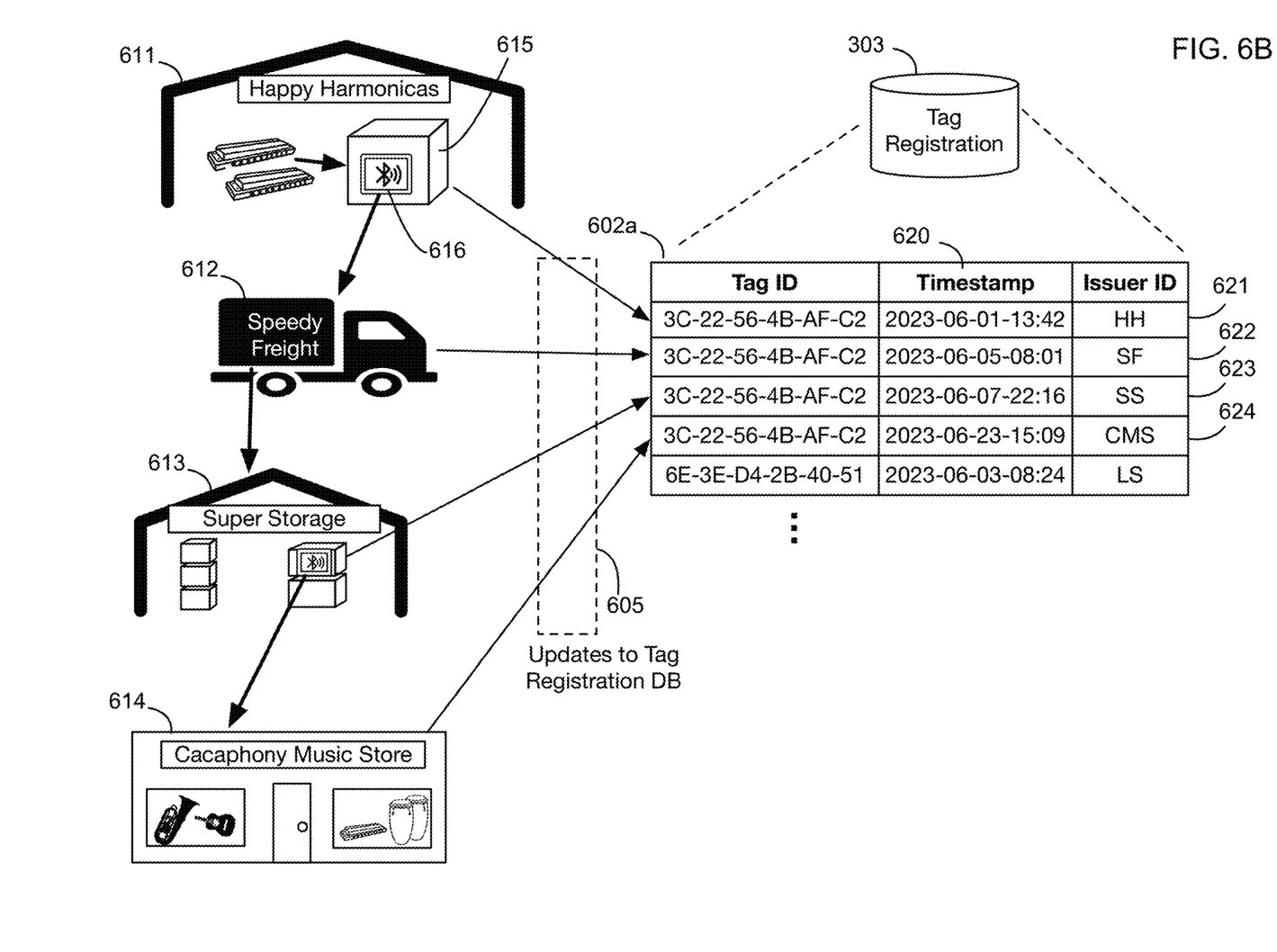
FIG. 6B illustrates a variation of tag registration information that may support changing the tag issuer for a tag over time, for example as an item flows through the supply chain.

In the example shown in FIG. 6A, the association between a tag identifier and a tag issuer in table 602 is fixed throughout the life of the tag. In one or more embodiments, the tag issuer associated with a tag may change over time. FIG. 6B shows an illustrative example of an item 615 with a tag 616 that moves through the supply chain, where the item ownership changes as the item arrives at a location associated with a new owner. The new owner (or another party) may update the issuer identifier for the tag when it receives the item. To support changes in the issuer identifier, table F02a includes a timestamp 620 of when the issuer takes ownership of the tag, so that the records of the table show the ownership of the tag at different points in time. For example, original manufacturer 611 of the item transmits data 621 to table 602a when tag 616 is activated and attached to item 615. When the item is transmitted to a transportation provider 612, the transportation provider transmits data 622 to table 602a to indicate the change in tag ownership at the time the item is received by transporter 612. Transporter 612 then delivers the item to a distributor warehouse 613 that transmits data 623 to table 602a when the item is received at the warehouse. Finally, the distributor ships the item to a retail store F14 that transmits data 624 to table 602a when it receives the item at the store. Each entity can track the items it has ownership of, and the table 602a provides information on the full chain of custody for the item through the supply chain, for example for traceability.

Figure 7:
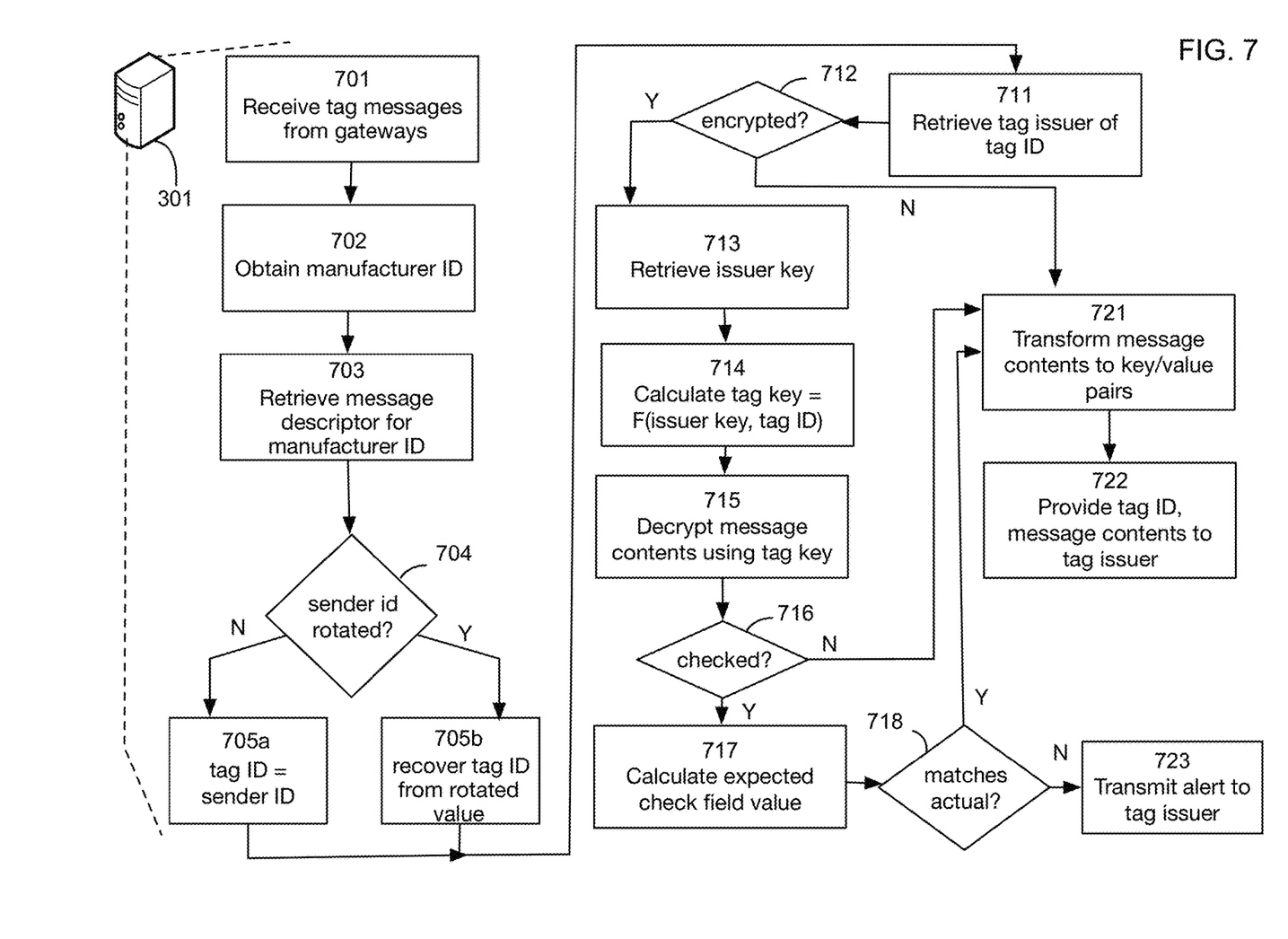
FIG. 7 shows an illustrative flowchart of steps performed by a processor in one or more embodiments of the invention to process incoming tag messages.

FIG. 7 shows an illustrative flowchart of steps that processor 301 may take in one or more embodiments to process tag message received from the gateways. These steps are illustrative; in one or more embodiments the processor may perform a subset of these steps, may perform steps in a different order, and may add additional steps. In step 701 the processor receives any number of tag messages from any number of gateways. The remaining steps apply to each tag message received. In step 702 the processor obtains the manufacturer identifier from the tag message. In step 703 the processor receives the message descriptor data associated with the manufacturer identifier from the tag manufacturers database. In step 704 the processor uses the message descriptor to determine whether the sender identity in the tag messages is equal to the tag identifier or is a rotated identifier that changes over time. If the identity is not rotated, step 705a sets the tag identifier to the sender identifier; otherwise step 705b calculates the tag identifier from the sender identifier along with knowledge of the identifier rotation sequence or algorithm. In some messages, the sender identifier may be part of the encrypted portion of the message, and step 705b may recover the tag identifier from this encrypted portion using any decryption method or algorithm. In step 711 the processor retrieves the tag issuer identifier associated with tag identifier from the tag registration database. In step 712 the processor uses the tag message descriptor to determine whether the tag message contents are encrypted. If the contents are encrypted, the processor may decrypt the contents in one or more embodiments before transmitting the message to the tag issuer. (In one or more embodiments the processor may transmit the encrypted data to the issuer and the issuer itself may perform the decryption.) In this illustrative embodiment, for encrypted messages step 713 retrieves the issuer key associated with the tag issuer from the tag registration database. Step 714 then calculates a tag-specific key for the tag as a function of the issuer key and the tag identifier. (This illustrative encryption scheme avoids the overhead of having to store and manage keys for each individual tag, since each tag key can be calculated from the issuer key and the tag identifier.) Any known function may be used to calculate the tag-specific key; the function may be fixed for all manufacturers and issuers, or it may vary across manufacturers and issuers and may be described for example in the tag manufacturers database or the tag registration database. Using the tag key, in step 715 the processor may decrypt the message contents of the tag message. It may then determine in step 716 whether the message has an integrity check field; if so, in step 717 it may calculate the expected integrity check field value (for example, by using the tag key and the rest of the message) and compare it in step 718 to the actual integrity check field value. If the values do not match, step 723 may transmit an alert, for example to the tag issuer, indicating that the message has been altered. In one or more embodiments, step 721 may then transform the message contents (which may have been decrypted) into key-value pairs, showing for example sensors and sensor values. Step 722 may then provide the message contents and the tag identifier to the associated tag issuer. Providing the message contents and tag identifier to the tag issuer may for example include transmitting this information to a destination associated with the tag issuer. It may instead or in addition include for example displaying this information on a web service such as a cloud dashboard that is accessible to the tag issuer, such as a dashboard provided by the tag message routing system that allows tag issuers to view information on all of their tags.

Figure 8:
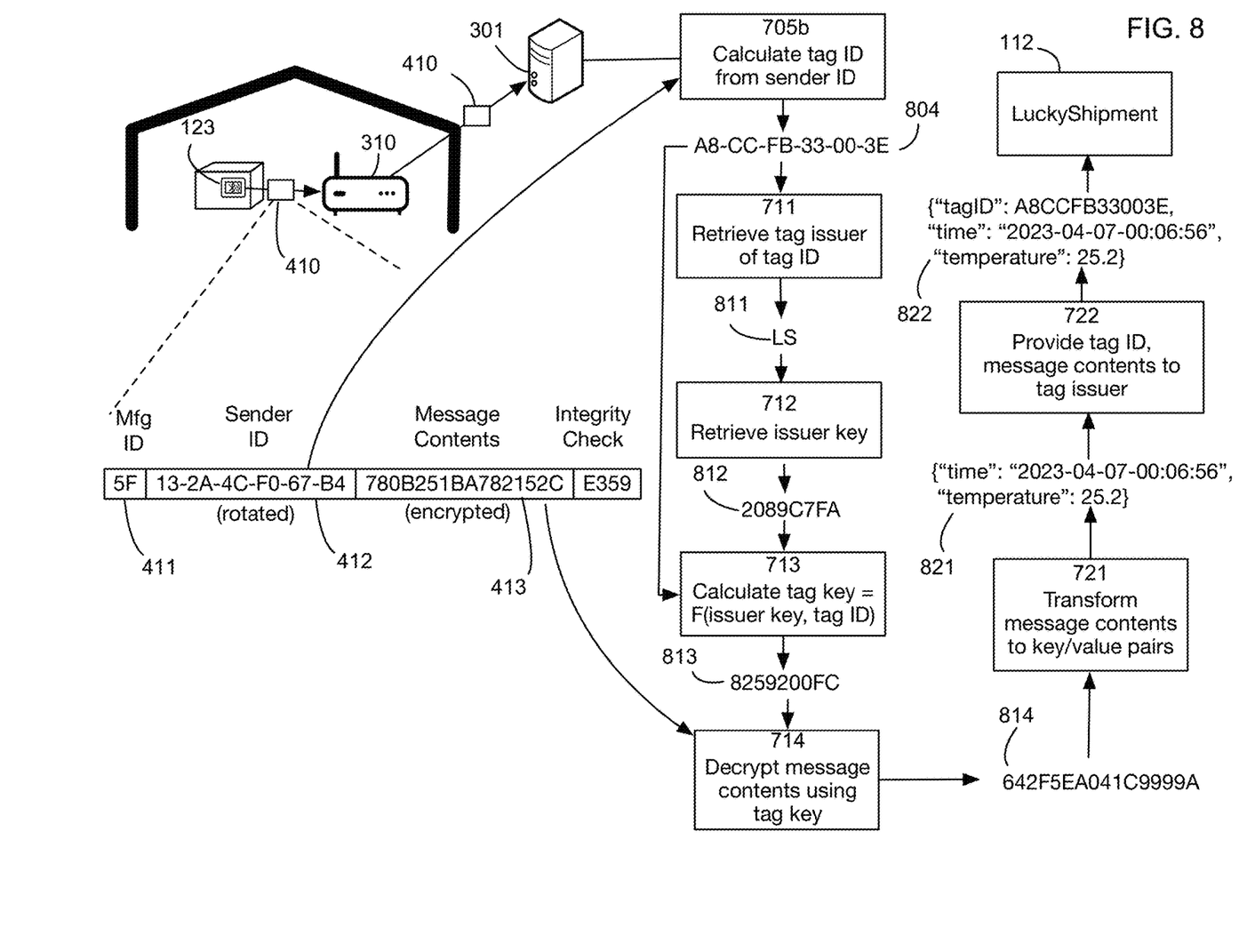
FIG. 8 illustrates steps of the flowchart of FIG. 7 applied to one of the tag messages of FIG. 4.

FIG. 8 illustrates selected steps of the flowchart of FIG. 7 applied to tag message 410 transmitted from tag 123 to gateway 310 and forwarded to processor 301. The sender identifier 412 of the message is rotated (as indicated in entry for tag manufacturer 411 in tag manufacturers database 302), so step 705b calculates the original tag identifier 804 from the sender identifier. Step 711 retrieves tag issuer identifier 811 from the tag registration database 303, table 602. The tag message descriptor for manufacturer D11 indicates that the message contents 413 are encrypted, so step 712 retrieves issuer key H12 from the tag registration database 303, table 601. Step 713 calculates tag key 813 from the tag identifier 804 and the issuer key 812, and step 714 decrypts encrypted contents 413 using the tag key 813, to obtain decrypted message contents 814. Step 721 transforms contents 814 to key-value pairs 821, using the message descriptor for the tag manufacturer. Key-value pairs 821 are shown as a JSON map; one or more embodiments may use any format to represent this data. Step 722 provides this data along with the tag identifier in message 822 to the tag's tag issuer 112. The data in message 822 may also be accessible to the tag issuer on a cloud dashboard.

Figure 9:
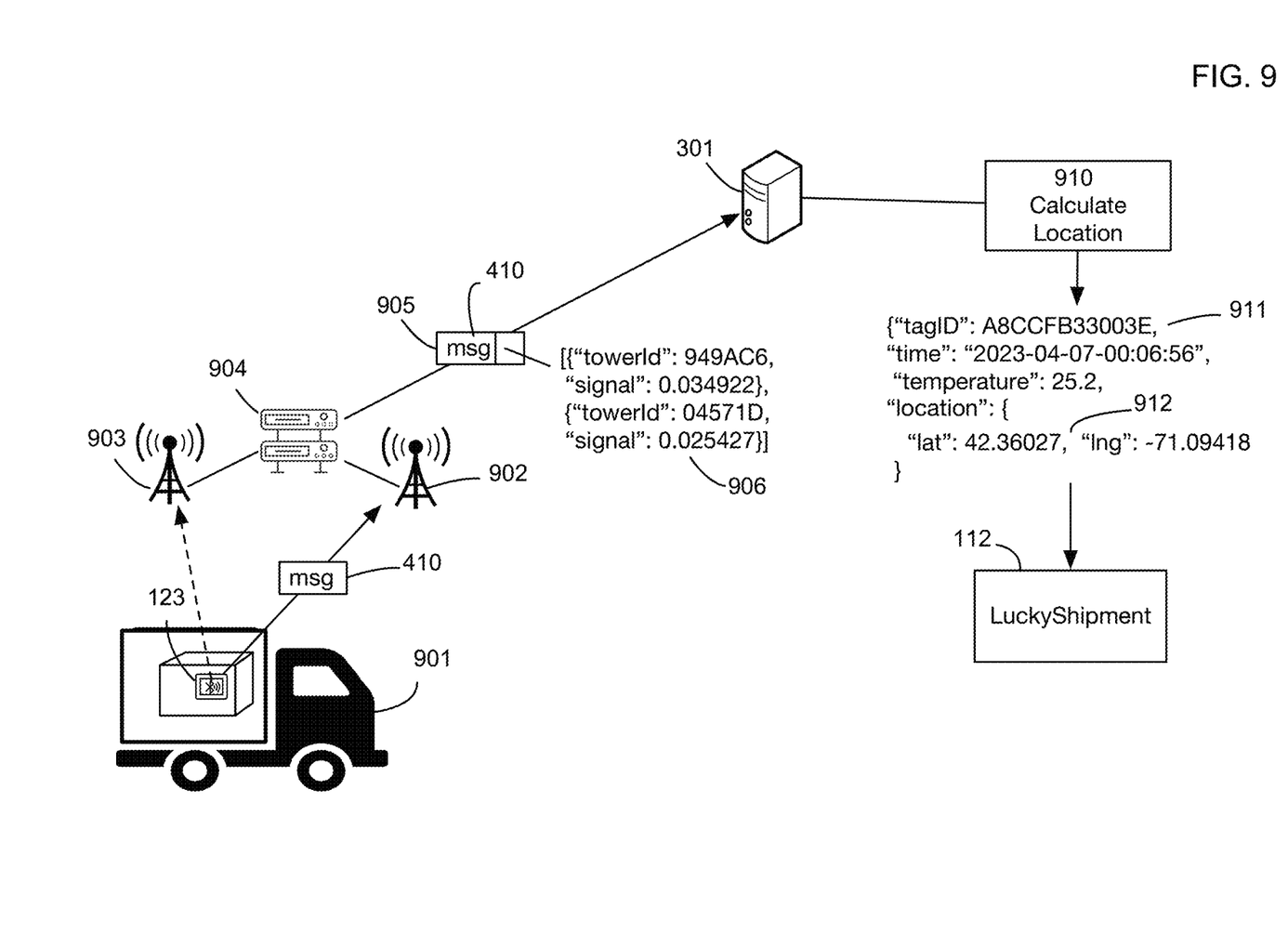
FIG. 9 illustrates an embodiment of the invention that receives additional information from a gateway, and that processes this information with a tag message to calculate the tag's location.

In one or more embodiments of the invention, the gateways or other systems may transmit additional information along with a tag message (or associated with a tag or tag message) that may also be processed by the central processor. FIG. 9 shows an example of tag message 410 transmitted to a cellular gateway (for example while the item to which tag 123 is being transported). The cellular gateway 904 may for example be connected to multiple cellular towers 902 and 903, each of which may register a signal strength of a connection to tag 123. This data may be used to triangulate the location of the tag. Cellular gateway 904 sends message 105 to processor 301; message 905 contains the original tag message 410 augmented with the gateway data 906. Processor 301 may process the tag message as described previously and may also perform step 910 to calculate the location of the tag from the data 906. A message 911 containing the tag identifier, the decoded message contents, and the calculated location 912, may be transmitted to tag issuer 112. This example of using signal strength to triangulate position is illustrative; any data obtained by a gateway about the tag may be transmitted to the processor along with the tag message and may be used by the processor to augment the information forwarded to the tag issuer.

While the invention herein disclosed has been described by means of specific embodiments and applications thereof, numerous modifications and variations could be made thereto by those skilled in the art without departing from the scope of the invention set forth in the claims.

What is claimed is:

1. A universal tracking tag message router, comprising:
   a processor coupled by communication links to
   a plurality of tag issuers, each comprising a computer, wherein
   each tag issuer of said plurality of tag issuers issues one or more of a multiplicity of tracking tags that are configured to be coupled to items to be tracked;
   each tracking tag of said multiplicity of tracking tags is associated with a tag manufacturer of a plurality of tag manufacturers; and
   said each tracking tag of said multiplicity of tracking tags comprises a tag identifier that uniquely identifies said each tracking tag;
   a multiplicity of tag message gateways, wherein
   each tag message gateway of said multiplicity of tag message gateways is configured to
   receive tag messages from one or more tags of said multiplicity of tracking tags over a wireless communications link when said one or more tags are within range of said each tag message gateway; and
   forward said tag messages to said processor;
   each of said one or more tags may be associated with any tag issuer of said plurality of tag issuers and with any tag manufacturer of said plurality of tag manufacturers;
   each tag message of said tag messages comprises
   a manufacturer identifier that identifies the tag manufacturer of a tracking tag that sends said each tag message;
   a sender identifier based on said tag identifier of said tracking tag; and
   tag message contents;
   a tag manufacturer database comprising a tag message descriptor associated with each tag manufacturer of said plurality of tag manufacturers, wherein said tag message descriptor comprises
   said manufacturer identifier associated with said each tag manufacturer;
   a message contents descriptor that describes contents of a tag message from tags manufactured by said each tag manufacturer;
   a tag registration database comprising said tag identifier associated with said each tracking tag; and,
   a tag issuer associated with said each tracking tag;
   wherein said processor is configured to
   receive updates to said tag registration database from said each tag issuer of said plurality of tag issuers;
   receive said tag messages from said each tag message gateway of said multiplicity of tag message gateways; and,
   process said each tag message of said tag messages to obtain said manufacturer identifier from said each tag message;
   retrieve said tag message descriptor associated with said manufacturer identifier from said tag manufacturer database;
   calculate said tag identifier from said sender identifier;
   retrieve said tag issuer associated with said tag identifier from said tag registration database; and,
   provide said tag identifier and said tag message contents to said tag issuer.

2. The universal tracking tag message router of claim 1, wherein
   said tag message descriptor further comprises
   an encrypted flag that indicates whether all or a portion of said tag message contents is encrypted;
   said tag registration database further comprises
   decryption information associated with said each tracking tag that comprises encrypted tag message contents;
   said processor is further configured to
   when said encrypted flag of said tag message descriptor is true,
   retrieve said decryption information associated with said tag identifier from said tag registration database; and
   decrypt said tag message contents using said decryption information.

3. The universal tracking tag message router of claim 2, wherein
   said decryption information comprises an issuer key associated with said each tag issuer that issues tracking tags with said encrypted tag message contents;
   said decrypt said tag message contents comprises
   retrieve said issuer key associated with said tag identifier from said tag registration database;
   calculate a tag key based on said issuer key and on said tag identifier; and,
   decrypt said tag message contents using said tag key.

4. The universal tracking tag message router of claim 3, wherein
   said each tag message of said tag messages further comprises a tag message integrity check field; and
   said processor is further configured to
   calculate an expected integrity check field from said tag message contents and from said tag key;

compare said expected integrity check field to said tag message integrity check field; and transmit an alert to said tag issuer associated with said tag identifier when said expected integrity check field does not match said tag message integrity check field.

5. The universal tracking tag message router of claim 1, wherein said tag message descriptor further comprises a sender identifier rotation flag that indicates whether said sender identifier changes over time to prevent unauthorized tracking;

calculate said tag identifier from said sender identifier comprises transform said sender identifier of said each tag message into said tag identifier based on said sender identifier rotation flag of said tag message descriptor.

6. The universal tracking tag message router of claim 5, wherein said tag issuer associated with one or more of said multiplicity of tracking tags may change over time.

7. The universal tracking tag message router of claim 1, wherein said tag message contents comprises measurement of one or more sensor values from one or more sensors of said tracking tag; and said processor is further configured to transform said tag message contents using said tag message descriptor to one or more key-value pairs comprising said one or more sensor values.

8. The universal tracking tag message router of claim 1, wherein said each tag message gateway is further configured to transmit gateway information to said processor with said tag messages; and said processor is further configured to calculate a location of said tracking tag associated with said each tag message from one or both of said tag message contents and said gateway information; and, provide said location of said tracking tag to said tag issuer.

9. The universal tracking tag message router of claim 1, wherein said wireless communications link between said one or more tags of said multiplicity of tracking tags and said each tag message gateway comprises one or more of Bluetooth, Bluetooth Low Energy, RFID, NFC, and Wi-Fi.

* * * * *